United States Patent [19]

Mizunoya et al.

[11] 4,366,080

[45] Dec. 28, 1982

[54] LIQUID CRYSTAL DISPLAY ELEMENT

[75] Inventors: Kiyoshi Mizunoya; Shoichi Matsumoto, both of Yokohama; Hitoshi Tomii, Kawasaki; Masahiro Kawamoto, Yokohama; Yuusuke Wada, Chigasaki, all of Japan

[73] Assignee: Tokyo Shibaura Denki Kabushiki Kaisha, Kawasaki, Japan

[21] Appl. No.: 242,030

[22] Filed: Mar. 9, 1981

[30] Foreign Application Priority Data

Apr. 7, 1980 [JP] Japan .................................. 55/44683
Jan. 16, 1981 [JP] Japan .................................. 56/3873

[51] Int. Cl.$^3$ .......................... G02F 1/13; C09K 3/34
[52] U.S. Cl. .............................. 252/299.3; 252/299.2
[58] Field of Search .......................... 252/299.3, 299.2

[56] References Cited

U.S. PATENT DOCUMENTS

| | | | |
|---|---|---|---|
| 3,838,059 | 9/1974 | Wong | 252/299.3 |
| 3,932,298 | 1/1976 | Labes | 252/299.3 |
| 3,975,285 | 8/1976 | Ohnishi et al. | 252/299.3 |
| 3,979,020 | 9/1976 | Ozutsumi et al. | 252/299.3 |
| 3,990,984 | 11/1976 | Barret et al. | 252/299.3 |
| 4,066,569 | 1/1978 | Lim | 252/299.3 |

FOREIGN PATENT DOCUMENTS 49-95881 9/1974 Japan .................................. 252/299.3

OTHER PUBLICATIONS

The Merck Index, 8th Ed., p. 1079 (TNF), Merck & Co., Inc., Rahway, N.J., (1968).

*Primary Examiner*—Teddy S. Gron
*Attorney, Agent, or Firm*—Oblon, Fisher, Spivak, McClelland & Maier

[57] ABSTRACT

A liquid crystal display element utilizing dynamic scattering uses a liquid crystal composition comprising a liquid crystal and charge transfer complex. The charge transfer complex contains nitro-substituted 9-fluorenones as the electron acceptor.

15 Claims, No Drawings

LIQUID CRYSTAL DISPLAY ELEMENT

This invention relates to a liquid crystal display element based on a liquid crystal composition of the dynamic scattering type.

When impressed with voltage, a composition including a liquid crystal indicating negative dielectric anisotropy whose conductivity is elevated by the addition of an organic electrolyte like a quarternary ammonium salt, for example, tetrabutylammonium bromide gives rise to dynamic scattering (DS). Many liquid crystal display elements are manufactured by utilizing the above-mentioned phenomenon. Where A.C. voltage is impressed, the conventional DS type liquid crystal display element can indeed indicate a stable display function. Where, however, D.C. voltage is impressed, the liquid crystal and electrolyte of the prior art DS type liquid crystal display element are deteriorated electrochemically, resulting in the possibility that the display element will lose a required display function even during an operation of several hours to several days. Particularly, a Schiff base liquid crystal generally used as a type indicating negative dielectric anisotropy is unstable chemically as well as electrochemically when impressed with D.C. voltage, and is found unadapted to be actuated by D.C. voltage.

In recent years, attempts have been made to apply a liquid crystal display element to the display of an image from the standpoint of rendering a display apparatus thin and compact, and minimizing power consumption. For such application, the display element has to indicate gray scale, and also the number of picture elements has to be increased. In this case, a display system comprising a switching circuit for each picture element has the advantages that the display of gray scale is made easier than in the time sharing drive (matrix drive) display system, and crosstalks are suppressed. However, application of D.C. power required for the above-mentioned display system of the switching circuit driving type leads to the deterioration of a liquid crystal and a decline in the image display function.

Therefore, the stability of a liquid crystal is an important factor in ensuring the life of a DS type liquid crystal display element capable of being actuated by D.C. voltage.

In this connection, it is reported in Appl. Phys. Lett 21. 142 (1972), A. I. Baise et al that threshold voltage for dynamic scattering can be effectively reduced by mixing a liquid crystal with an electron acceptor alone as a conductivity-elevating agent in the sense that a nonionic material is added to a liquid crystal instead of the above-mentioned ionic organic electrolyte. In this case, too, however, a liquid crystal tends to lose a required display function even during an operation of several hours to several days. This event is assumed to result from the fact that a charge transfer complex is formed between a liquid crystal and an electron acceptor added thereto, and impression of D.C. voltage causes the liquid crystal to be electrochemically deteriorated on an electrode.

To the best of our knowledge, no conductivity-elevating agent has been developed to date which imparts a sufficiently high conductivity to a liquid crystal composition for dynamic scattering and extends the life of any kind of liquid crystal composition.

It is accordingly the object of this invention to provide a liquid crystal display element which is adapted to be actuated by D.C. voltage, can effectively utilize dynamic scattering and be operated over a long period of time with a prominent display function.

With a liquid crystal display element according to this invention, the liquid crystal composition comprises a liquid crystal and a charge transfer complex formed of an electron acceptor and electron donor, said electron acceptor being at least one nitro-substituted 9-fluorenone expressed by the general structural formula:

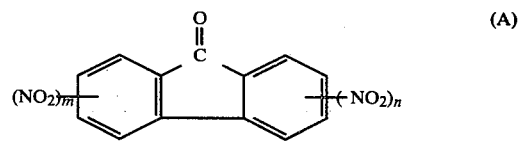

where m and n are each an integer of 0 to 4, and m plus n are an integer of 1 to 4.

As is well known to those skilled in the art, a liquid crystal composition according to this invention is filled between a pair of electrode substrates, at least one of which is transparent.

Where a liquid crystal is blended in accordance with this invention with a charge transfer complex whose electron acceptor is at least one nitro-substituted 9-fluorenone (Formula (A)), then a display element can be provided which sustains a prominent display function by dynamic scattering even when actuated by D.C. voltage.

As described above, a liquid crystal composition used with a liquid crystal display element according to this invention contains a charge transfer complex whose electron acceptor is at least one nitro-substituted 9-fluorenone of Formula (A). This nitro-substituted 9-fluorenone may be a mononitro substituent ($m+n=1$), a dinitro substituent ($m+n=2$), trinitro substituent ($m+n=3$) or tetranitro substituent ($m+n=4$).

The mononitro substituent includes 3-nitro-9-fluorenone. The dinitro substituent includes 2,5-, 2,6- and 2,7-dinitro-9-fluorenones. The trinitro substituent includes 2,4,7-trinitro-9-fluorenone. The tetranitro substituent includes 2,4,5,7-tetranitro-9-fluorenone. This last mentioned 2,4,5,7-tetranitro-9-fluorenone is most preferred.

An electron donor which can be coupled with the electron acceptor (in the molar ratio of 1:1) to constitute the charge transfer complex may be of any type, provided it well serves the purpose.

The electron donor includes, for example, metallocene deviatives such as di-n-butylferrocene; phenylenediamine deviatives such as N,N,N',N'-tetraphenyl phenylenediamine; diphenylamine deviatives such as diphenyl benzidine; hydroquinone deviatives such as tetrachlorohydroquinone; tetrathiafulvalene deviatives such as tetrathiafulvalene; hydrazine deviatives such as 1,1-diphenyl-2-pycryl hydrazine.

Liquid crystals used with a liquid crystal display element according to this invention are not critical and any suitable type of them can be used. The liquid crystal includes:

(1) Cyclohexane carboxylic acid ester type (phenyl esters of cyclohexane carboxylic acids) liquid crystals such as:

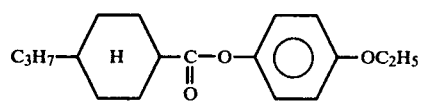
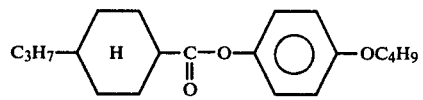
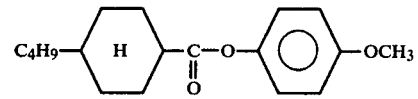
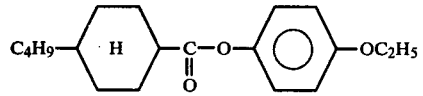
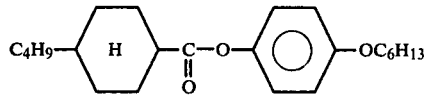
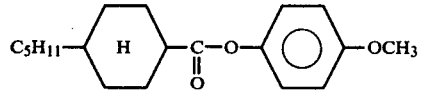
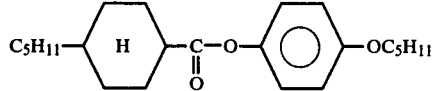
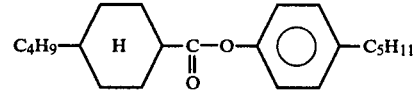
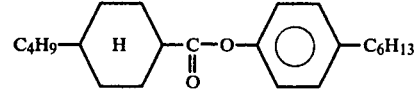

(2) Cyclohexyl biphenyl cyclohexane type (4,4'-bis(-cyclohexyl)biphenyls) liquid crystals such as:

(3) Phenyl ester type (phenyl benzoates) liquid crystals such as:

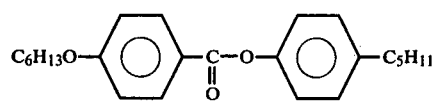
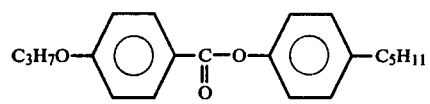

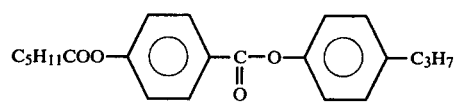
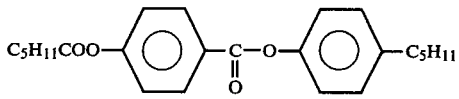

(4) Dialkyl benzoic acid phenyl ester type alkyl benzoic acid alkyl phenyl ester liquid crystals such as:

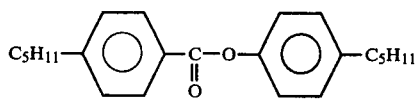
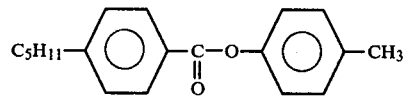
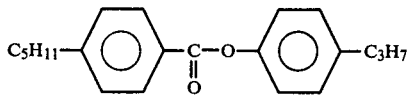
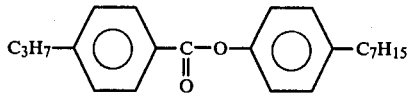

(5) Phenyl cyclohexane type (phenylcyclohexanes) liquid crystals such as:

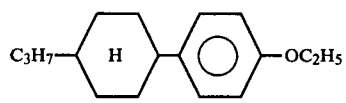
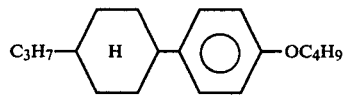
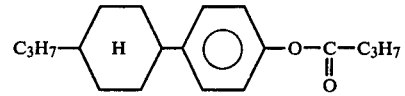
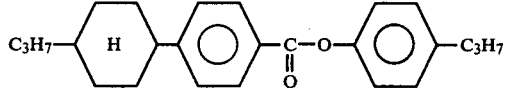
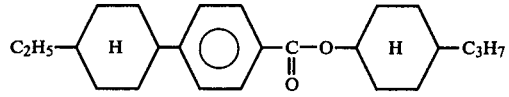
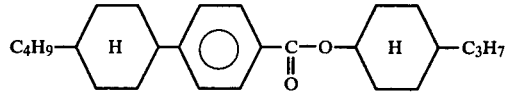

(6) Biphenyl cyclohexane type (biphenylcyclohexanes) liquid crystals such as:

(7) Biphenyl type (biphenyls) liquid crystals such as:

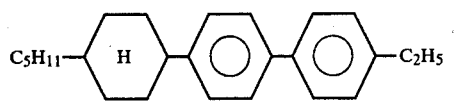

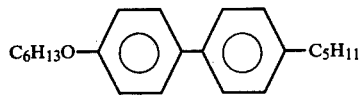

(8) Azoxy type (azoxybenzenes) liquid crystals such as:

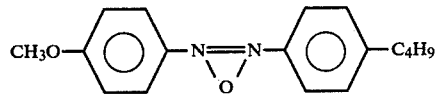

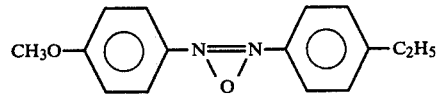

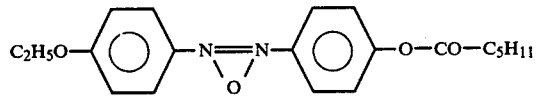

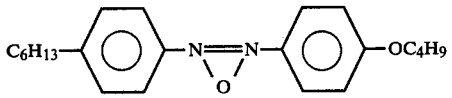

(9) Schiff base type (n-phenylbenzimines) liquid crystals such as:

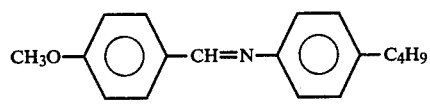

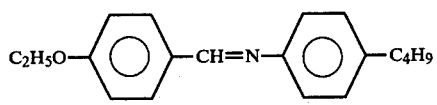

(10) Azo type (azobenzenes) liquid crystals such as:

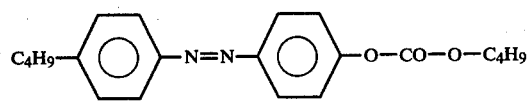

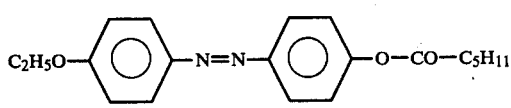

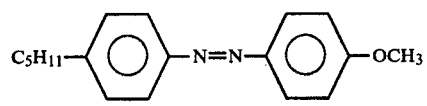

(11) Stilbene type (stilbenes) liquid crystals such as:

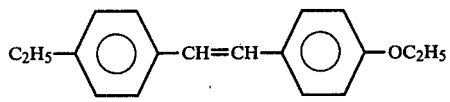

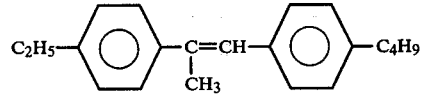

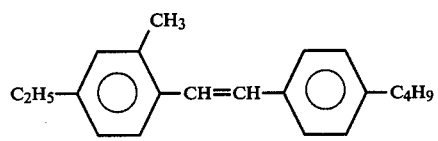

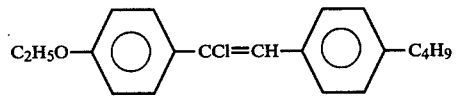

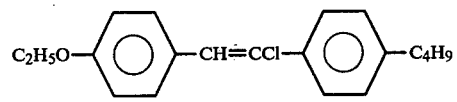

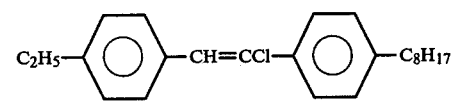

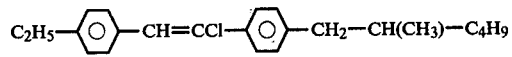

(12) Pyrimidine type (2-phenylpyrimidines) liquid crystals such as:

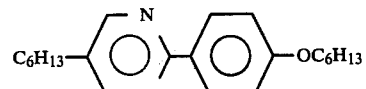

It is possible to use a mixture of two or more of the above listed liquid crystals.

A charge transfer complex whose electron acceptor is nitro-substituted 9-fluorenone of Formula (A) is added to a liquid crystal in an amount sufficient to give rise to dynamic scattering in the liquid crystal. This amount is generally 0.1 to 5% by weight based on the weight of a liquid crystal, but is not limited thereto.

The liquid crystal together with the charge transfer complex are filled and sealed according to the conventional method in a space formed by a spacer made of e.g., Mylar, between a pair of opposed electrodes, at least one of the electrodes being transparent, for example, glass base plates prepared by depositing indium oxide, tin oxide or the like thereon to provide a display element.

The charge transfer complex used with a liquid crystal display element of this invention is well compatible with a liquid crystal and easily provides the liquid crystal with a sufficiently high conductivity for the generation of dynamic scattering. Impression of D.C. voltage on a liquid crystal composition containing such charge transfer complex causes oxidation and reduction to take place easily and reversibly in the liquid crystal over a long period of time. Therefore, the liquid crystal element of the invention stably maintains the desired display function for a long time.

The above-mentioned advantageous effect is realized only by mixing a liquid crystal with a charge transfer complex whose electron acceptor is the nitro-substituted 9-fluorenone of Formula (A). Where the electron acceptor of nitro-substituted 9-fluorenone alone is added to a liquid crystal, then the liquid crystal is not fully increased in conductivity though dynamic scattering takes place. Moreover, in this case the liquid crystal indicates a low contrast, has a short life when actuated by D.C. voltage and gives rise to wide current variations when supplied with power. Where the electron donor alone is added to a liquid crystal, then a liquid crystal element can not have a sufficiently high conductivity to produce dynamic scattering. Where the electron acceptor alone is added to a liquid crystal, a charge transfer complex is formed between the liquid crystal and electron acceptor, indeed elevating the conductivity of the resultant liquid crystal element to a certain extent. In this case, however, it is assumed that charge transfer repeatedly takes place between the liquid crystal and the electrode assembly, deteriorating the liquid crystal by electrochemical reaction and shortening the life of the liquid crystal element when actuated by D.C. voltage. Further where the electron donor alone is added to a liquid crystal, it is supposed that since a liquid crystal generally has a low capacity to accept electrons, a charge transfer complex is not formed between the liquid crystal and electron donor; and the addition of the electron donor only has the same action as that of a nonionic organic material, failing to increase the conductivity of the liquid crystal.

This invention will be more fully understood from the following examples.

EXAMPLE 1

3 parts by weight of 4-ethoxyphenyl-trans-4-butylcyclohexyl carboxylate, 3 parts by weight of 4-pentoxyphenyl-trans-4-pentylcyclohexyl carboxylate, 1 part by weight of 4-propylphenyl-4-hexanoyloxybenzoate, 1 part by weight of 4-pentylphenyl-4-hexanoyloxybenzoate and 2 parts by weight of 4-methoxybenzylidene-4'-butylaniline were mixed to provide a mixed liquid crystal. This mixed liquid crystal had conductivity of $10^{-11}$ ($\Omega cm^{-1}$) or less, and a nematic liquid crystal temperature range of 0° to 63° C. The above-mentioned liquid crystal was mixed with 2% by weight of a charge transfer complex whose electron donor was di-n-butylferrocene and whose electron acceptor was 3-nitro-9-fluorenone to prepare a liquid crystal composition. This liquid crystal composition had a conductivity of $1.5 \times 10^{-10}$ ($\Omega cm^{-1}$). The liquid crystal composition was filled between a pair of glass electrode plates on which a layer of tin oxide was thermally deposited to provide a liquid crystal cell (element). The liquid crystal element thus formed was actuated by impression of D.C. voltage of 6 V or more.

Then dynamic scattering appeared with the formation of a white turbit region, indicating that the liquid crystal element had a display function. For determination of an effective life, the liquid crystal display element was impressed with D.C. voltage of 15 V and held in a thermostat at 60° C. to check changes in the current value and external appearance of the display element. After voltage was introduced through the display element continuously for 5,000 hours, the edge portions of the electrode assembly were slightly deteriorated, but little change was recognized in the current value. The display element was shown to produce full dynamic scattering. Tests carried out under the above-mentioned forced conditions showed that when applied under the ordinary conditions at normal temperature, the above-mentioned liquid crystal display element of this invention was assumed to have an effective life of about three years or more.

For better understanding of the present invention, description is now given of the following controls.

CONTROL 1

A liquid crystal composition was prepared by mixing the mixed liquid crystal of Example 1 with 1.0% by weight of an electron donor formed of di-n-butylferrocene. The liquid crystal composition thus prepared had a conductivity of $1.2 \times 10^{-11}$ ($\Omega cm^{-1}$). The liquid crystal composition was filled between a pair of glass electrode plates on which a layer of tin oxide was thermally deposited to provide a liquid crystal display element. When actuated by a D.C. voltage of 60 V or more, said display element showed slight dynamic scattering, proving that it was necessary to apply considerably high voltage for the full actuation of said display element.

As described above, the object of this invention cannot be attained in Controls 1 and 2. In other words, the individual application of the electron acceptor and donor used in this invention does not give a full effect.

EXAMPLE 2

3 parts by weight of 4-trans-(4-propyl)cyclohexylphenyl butyrate, 2 parts by weight of trans-4-propyl(4-ethoxyphenyl)cyclohexane, 2 parts by weight of 4-methoxybenzylidene-4'-butylaniline, 2 parts by weight of 4-ethoxybenzylidene-4'-butylaniline, and 1 part by weight of trans-4-pentylcyclohexyl-(trans-4-propylcyclohexyl)biphenyl were blended together to provide a mixed liquid crystal. This mixed liquid crystal had a conductivity of $10^{-11}$ ($\Omega cm^{-1}$) or less, and a nematic liquid crystal temperature range of −10° to 56° C.

The mixed liquid crystal was blended with 2.0% by weight of a charge transfer complex whose electron donor was di-n-butylferrocene and whose electron acceptor was 2,7-dinitro-9-fluorenone to prepare a liquid crystal composition. This liquid crystal composition had a conductivity of $2 \times 10^{-10}$ ($\Omega cm^{-1}$). The liquid crystal composition thus prepared was filled between a pair of glass electrode plates on which a layer of tin oxide was thermally deposited to constitute a liquid crystal display cell (element). When impressed with a D.C. voltage of 6 V or more, the liquid crystal display element thus prepared gave rise to dynamic scattering with the formation of a white turbit region, proving to have a display function. For determination of an effective life, the liquid crystal display element was impressed with D.C. voltage of 15 V and held in a thermostat at 60° C. to check changes in the current value and external appearance of the display element. After voltage was introduced through the display element continuously for 5,000 hours, the edge portions of the electrode assembly were slightly deteriorated, but little change was recognized in the current value. The display element was shown to give rise to full dynamic scattering. Tests carried out under the above-mentioned forced conditions showed that when applied under the ordinary conditions at normal temperature, the above-mentioned liquid crystal display element embodying this invention was assumed to have an effective life of about three years or more.

Experiments were made under substantially the same conditions as described above, except that 2,7-dinitro-9-fluorenone used as an electron acceptor was replaced by 2,5-dinitro-9-fluorenone or 2,6-dinitro-9-fluorenone. Still the same results were ensured as in the first-mentioned experiment of Example 2.

EXAMPLE 3

2 parts by weight of 4-trans-propylcyclohexane carboxylic acid-4'-ethoxyphenyl ester, 2 parts by weight of 4-trans-pentylcyclohexane carboxylic acid-4'-pentoxyphenyl ester, 3 parts by weight of 4-transbutylcyclohexane carboxylic acid-4'-hexylphenyl ester, and 3 parts by weight of 4-methoxybenzylidene-4'-butylaniline were blended together to provide a mixed liquid crystal. This mixed liquid crystal had a conductivity of $10^{-11}$ ($\Omega cm^{-1}$) or less and a nematic liquid crystal temperature range of $-10°$ to $53°$ C.

The mixed liquid crystal was blended with 1.0% by weight of a charge transfer complex whose electron donor was di-n-butylferrocene and whose electron acceptor was 2,4,7-trinitro-9-fluorenone to prepare a liquid crystal composition. This liquid crystal composition had a conductivity of $2 \times 10^{-10}$ ($\Omega cm^{-1}$). The liquid crystal composition was filled between a pair of glass electrode plates on which a layer of tin oxide was thermally deposited to prepare a liquid crystal display cell (element). When impressed with a D.C. voltage of 6 V or more, the display element produced dynamic scattering with the formation of a white turbit region, proving to have a display function. For determination of an effective life, the liquid crystal display element was impressed with D.C. voltage of 15 V and held in a thermostat at 60° C. to check changes in the current value and external appearance of the display element. After voltage was introduced through the display element continuously for 5,000 hours, the edge portions of the electrode assembly were slightly deteriorated, but little change was observed in the current value. The display element was shown to produce sufficient dynamic scattering. Tests carried out under the above-mentioned forced conditions showed that when applied under the ordinary conditions at normal temperature, the above-mentioned liquid crystal display element embodying this invention supposedly had an effective life of about three years or more.

EXAMPLE 4

1 part by weight of 4-trans-butylcyclohexane carboxylic acid-4'-ethoxyphenyl ester, 1 part by weight of 4-trans-butylcyclohexane carboxylic acid-4'-hexyloxyphenyl ester and 1 part by weight of 4-trans-pentylcyclohexane carboxylic acid-4'-methoxyphenyl ester were mixed together. The mixture (which had a conductivity of $10^{-11}$ ($\Omega cm^{-1}$) or less) was blended with 1.0% by weight of a charge transfer complex whose electron donor was dibutylferrocene and whose electron acceptor was 2,4,5,7-tetranitro-9-fluorenone to provide a liquid crystal composition. This liquid crystal composition had a conductivity of $2 \times 10^{-10}$ ($\Omega cm^{-1}$) or less. The composition was filled between a pair of glass electrode plates on which a layer of tin oxide was thermally deposited to prepare a liquid crystal display cell (element). When impressed with a D.C. voltage of 6 V or more, the display element gave rise to dynamic scattering with the formation of a white turbit region, proving to have a sufficient display function. For evaluation of an effective life, the display element was impressed with D.C. voltage of 15 V and held in a thermostat at 60° C. to check changes in the current value and external appearance of the display element. After voltage was introduced through the display element continuously for 5,000 hours, the edge portions of the electrode assembly were slightly deteriorated, but noticeable changes were not observed in the current value, proving that the display element was shown to produce sufficient dynamic scattering. From the results of accelerated tests at 60° C., the display element assumed to have an effective life of about three years or more at a lower temperature.

EXAMPLE 5

22.5% by weight of trans-4-propyl-(4-butoxyphenyl)-cyclohexane, 27% by weight of trans-4-pentyl-(4-ethylbiphenyl)-cyclohexane, 27% by weight of 4-pentyl-4-methoxybenzoate, 13.5% by weight of 2-cyano-4-heptylphenyl-4'-pentyl-4-biphenyl carboxylate, and 10% by weight of 4-methoxybenzylidene-4'-butylaniline were mixed together to provide a liquid crystal. This mixed crystal had a conductivity of $10^{-11}$ ($\Omega cm^{-1}$) or less and a nematic liquid crystal temperature range of $-12°$ to $71°$ C. The mixed liquid crystal was blended with 1% by weight of a charge transfer complex whose electron donor was formed of N,N'-diphenylbenzidine and whose electron acceptor was formed of 2,4,5,7-tetranitro-9-fluorenone to prepare a liquid crystal composition. This composition indicated substantially the same properties as those of the composition of Example 1, thereby attaining the object of this invention.

Where N,N'-diphenylbenzidine used as an electron donor was replaced by, for example, N,N,N',N'-tetraphenyl phenylenediamine, it was possible to obtain the same result as the liquid crystal display element of the above Examples.

CONTROL 2

A liquid crystal composition was prepared by mixing the mixed liquid crystal of Example 5 with 1.0% by weight of an electron acceptor formed of 2,4,5,7-tetranitro-9-fluorenone. The liquid crystal composition thus prepared had a conductivity of $5 \times 10^{-11}$ ($\Omega cm^{-1}$). The liquid crystal composition was filled between a pair of glass electrode plates on which a layer of tin oxide was thermally deposited to provide a liquid crystal display element. When actuated even by a D.C. voltage of 6 V or more, this display element did not give rise to such dynamic scattering as was observed in the liquid crystal display element of Example 5. When D.C. voltage of 12 V was applied, dynamic scattering was observed for the first time. Even at this time, the display element of Control 2 had a low display function, making it necessary to impress a voltage of 40 V or more in order to provide a sufficiently distinct contrast. Where the life of this control display element was determined under the same conditions as in Example 5, the electrode assembly was colored after introduction of only 25 hours, and bubbles appeared in the display section. Determination was made of a point (NI point) at which the nematic liquid crystal of the liquid crystal material was transferred to an isotropic liquid. The point indicated a decrease of 15° C. from the initial temperature. This means that addition of the electron acceptor alone of Control 2 results in the deterioration of a liquid crystal when impressed with D.C. voltage.

What we claim is:

1. A dynamic scattering type liquid crystal display element adapted to be actuated by D.C. voltage, comprising:
    a pair of electrode substrates forming a space therebetween, at least one of which is transparent;
    a liquid crystal composition filled in said space, said composition comprising a liquid crystal, and a charge transfer complex formed of an electron acceptor and electron donor, said electron acceptor being at least one nitro-substituted 9-fluorenone expressed by the general formula

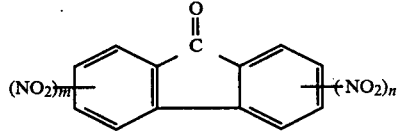

where m and n are each an integer of 0 to 4, and m plus n are an integer of 1 to 4.

2. The element according to claim 1, wherein m+n is 1.

3. The element according to claim 2, wherein the electron acceptor is 3-nitro-9-fluorenone.

4. The element according to claim 1, wherein m+n is 2.

5. The element according to claim 4, wherein the electron acceptor is 2,5-, 2,6- or 2,7-dinitro-9-fluorenone.

6. The element according to claim 1, wherein m+n is 3.

7. The element according to claim 6, wherein the electron acceptor is 2,4,7-trinitro-9-fluorenone.

8. The element according to claim 1, wherein m+n is 4.

9. The element according to claim 8, wherein the electron acceptor is 2,4,5,7-tetranitro-9-fluorenone.

10. The element according to claim 1, wherein the electron donor is selected from the group consisting of metallocene derivatives, phenylenediamine derivatives, diphenylamine derivatives, hydroquinone derivatives, tetrathiafulvalene derivatives and hydrazine derivatives.

11. The element according to claim 10, wherein the electron donor is dibutylferrocene.

12. The element according to any one of claims 1 to 11, wherein the charge transfer complex is present in an amount sufficient to produce dynamic scattering in the liquid crystal.

13. The element according to claim 12, wherein the charge transfer complex is present in an amount of 0.1 to 5% by weight based on the weight of the liquid crystal.

14. The element according to claim 12, wherein the liquid crystal comprises a phenyl ester of a cyclohexane carboxylic acid, a 4,4'-bis(cyclohexyl)biphenyl, a phenyl benzoate, a phenylcyclohexane, a biphenylcyclohexane, a biphenyl, an azoxybenzene, N-phenylbenzimine, an azobenzene, a stilbenene, or a 2-phenylpyrimidine.

15. The element according to claim 14, wherein the phenyl benzoate is a alkylbenzoic acid alkylphenyl ester.

* * * * *